United States Patent Office 2,891,903
Patented June 23, 1959

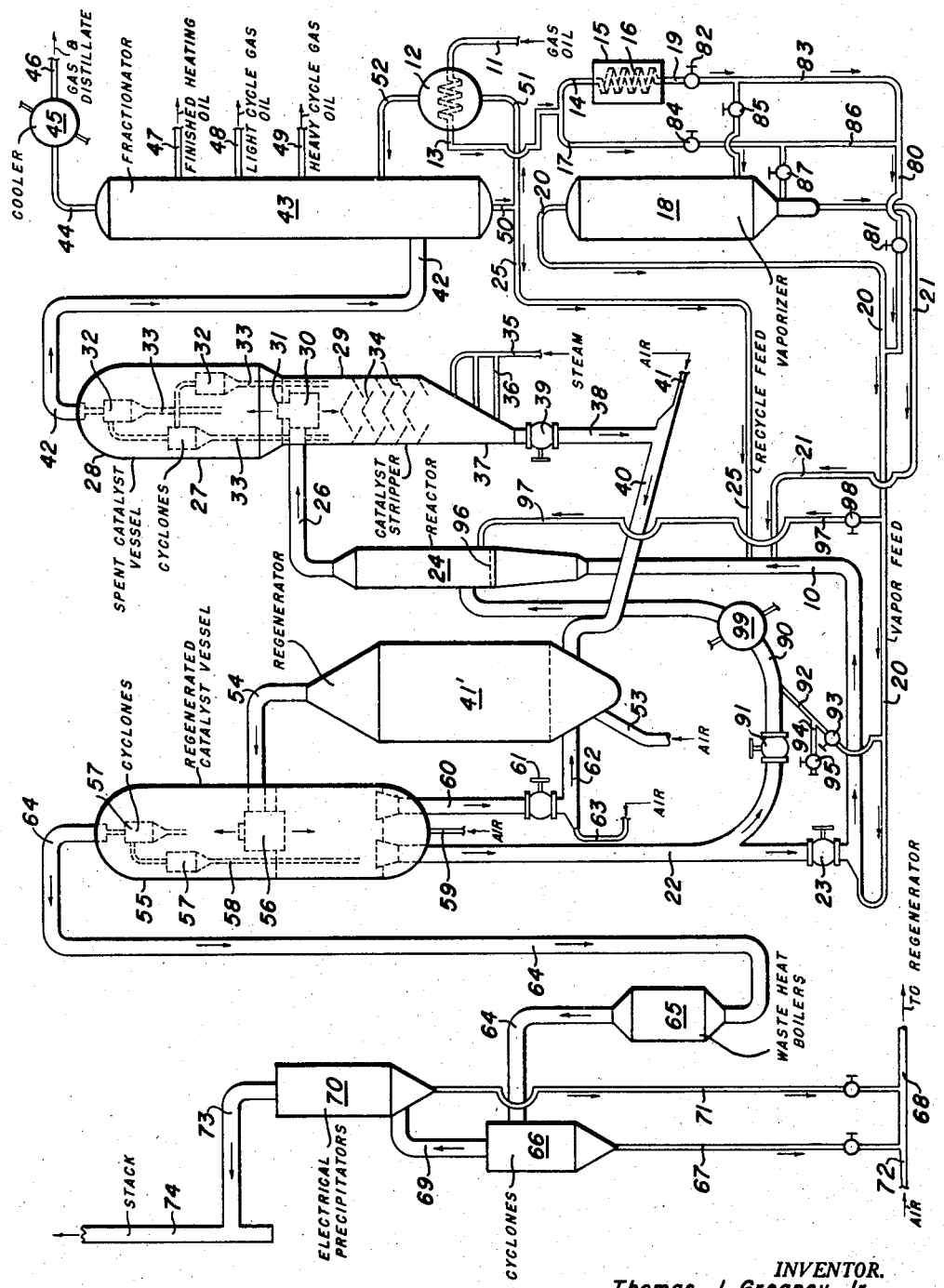

2,891,903

CATALYTIC PROCESS

Thomas J. Greaney, Jr., and William K. Roquemore, Baytown, Tex., assignors, by mesne assignments, to Esso Research and Engineering Company, Elizabeth, N.J., a corporation of Delaware Application March 9, 1955, Serial No. 493,098

5 Claims. (Cl. 208—74)

The present invention is directed to an improved method for treating vaporized materials with a suspended solid. More particularly, the invention is directed to converting organic materials in a suspension of finely divided catalyst in said vaporized organic materials. In its more particular aspects, the invention is directed to cracking of hydrocarbons under contacting conditions with a finely divided catalyst which gives substantially improved and unexpected results.

The present invention may be briefly described as a process for contacting vaporized materials with a contacting agent suspended therein in which the contacting agent and vapor flow cocurrently in a substantially single phase through a reaction zone at a high vapor velocity and in which a portion of the contacting agent is injected along with the vaporized material into the inlet of the reaction zone and another portion of the contacting agent is injected at at least one stream at a point downstream from the inlet of the reaction zone. The practice of the present invention particularly applies to catalytic reactions involving vaporized organic materials such as hydrocarbons and the like in which the activity of the catalyst declines due to the deposition of contaminating materials such as carbon and the like, and in which the rate of catalyst activity decline decreases with time such as in the case of catalytic cracking of vaporized hydrocarbons in the presence of finely divided cracking catalyst suspended therein.

Considerable interest has been displayed in high velocity, essentially single phase, suspended catalytic reactions because of the improved operations resulting therefrom such as increased throughput for a reactor of a given size, decreased carbon deposition on the catalyst in contrast to fluidized operations carried out with catalyst in the dense phase or mixed phase operations, and the like. However, in conducting these high velocity operations with catalyst density in the suspension being relatively low, some limitations on the extent of hydrocarbon conversion are encountered in elongated reactors of the type used in such operations if the high velocity cocurrent flow of gas and catalyst is maintained. For example, with a reactor of given dimensions, it has been found that increasing the extent of conversion can be obtained by increasing the catalyst hold-up in the reactor, i.e., by decreasing the weight ratio of feed per hour to catalyst in the reaction zone, but this may result in carrying the operation out under substantially dense catalyst phase conditions which introduces the disadvantages inherent in such situations. It also may require extending the length of the reactor to permit the increased catalyst hold-up and conversion.

It has been found unexpectedly that it is unnecessary to increase the reactor hold up, that is catalyst retention time in the reactor, in order to obtain high conversion levels for a given set of reaction conditions. By introducing only a portion of the catalyst with the feed cocurrently into the reaction zone, and then introducing one or more streams of freshly regenerated catalyst at a point downstream from the inlet of the reaction zone, such as at about 30% of the length of the reactor from the inlet, unexpectedly high conversions are obtained for a reactor of given dimensions, and for given catalyst and feed charge rates and for a given catalyst retention time in the vessel.

This operation particularly applies to contacting agents wherein the rate of activity decline of the catalyst decreases fairly rapidly with time; in other words, the catalyst becomes deactivated rather rapidly during the initial period in the reaction zone and then tends to become deactivated less rapidly during the remainder of its retention therein. By injecting only a portion of the fresh or freshly regenerated catalyst in the inlet of the reaction zone, following which the rate of activity decline decreases substantially, and then injecting another portion of fresh or freshly regenerated catalyst farther downstream, the cumulative catalyst activity of the partially spent catalyst and of the freshly regenerated or fresh catalyst is found to decline at a less rapid rate through the remainder of the reactor than would be the case if all of the catalyst were injected with the feed through the inlet. As a result, much higher conversions are obtained under a given set of conditions than are obtained in conventional operations.

The invention applies to various types of contacting operations wherein a finely divided solid is used whose rate of activity decline decreases with time as described above, such as in hydrocarbon contacting operations including hydroforming, reforming, catalytic cracking, and the like. It particularly applies, however, to cracking operations with finely divided cracking catalysts. Such operations are carried out under reaction conditions well known to those skilled in the art. For example, cracking reactions may take place at a temperature in the range from about 800° to about 1100° F.; a preferred range is from about 900° to 1100° F. with quite desirable results being obtained at about 930° F.

Pressures employed in such cracking operation may range from about atmospheric pressure to about 50 p.s.i.g. (pounds per square inch gauge) with a preferred range of pressures from about 20 to about 35 p.s.i.g.

The contacting operations of the present invention are obtained by flowing the suspension through the reaction zone at a superficial gas velocity in the range between about 8 and about 50 feet per second. It is undesirable to flow the suspension at a superficial gas velocity less than about 8 feet per second and the preferred range is from 8 feet per second to about 20 feet per second. Desirable results may be obtained in the range from about 10 to about 15 feet per second.

The reaction zone employed in the present invention is preferably an elongated reaction zone having a length to diameter ratio in the range from about 4:1 to about 20:1. Desirable results are obtained in a vertical elongated reaction zone having a length to diameter ratio of about 7:1. The reaction zone is preferably a vertical elongated reaction zone.

Also to obtain the beneficial results of the present invention, an amount of catalyst is maintained in the reaction zone sufficient to provide a weight ratio of hydrocarbon per hour to total catalyst in the reaction zone in the range from about 20:1 to about 300:1. Very good results may be obtained with a weight ratio of feed per hour to catalyst in the reaction zone in the range from about 70:1 to about 250:1.

Too, desirable results may be obtained by maintaining the catalyst rate in the operation depending on the velocity in the range of 8 to 50 feet per second in a maximum amount of 1 ton per second for the minimum velocity and a maximum amount of about 12 tons per second for the maximum velocity. At a velocity of about 20 feet per second the catalyst rate would be maintained up to about 4.5 tons per second. Thus, the catalyst loading in the reaction zone may be expressed by pounds per square foot. This may be expressed as catalyst loading in the reaction zone, and should not exceed 36 pounds per second per square foot for a gas velocity in feet per second of 8, and should not exceed 180 pounds per second per square foot for a gas velocity in feet per second of 20 or about 540 pounds per second per square foot at a gas velocity in feet per second of about 50. Employing these conditions, it is possible to obtain the beneficial results of the present invention.

In injecting the catalyst into the reaction zone in the multi-injection system of the present invention, it is preferred that the weight ratio of catalyst injected into the inlet of the reaction zone cocurrent with at least a portion of the feed to the catalyst injected downstream from the inlet be in the range of about 5:1 to 1:5, preferably from about 3:1 to 1:1.5; a ratio of about 1:1 is generally suitable in operations of this type. The additional catalyst injected downstream from the inlet may be conveniently injected as only one stream but in some cases it is preferred to inject this catalyst as two or more separate streams at different spaced points along the reactor.

The position at which these additional catalyst streams are injected with respect to the reactor inlet is important and preferably they are injected at one or more points that are within the range of 20 to 70% of the total length of the reactor from the inlet; especially useful results are obtained when these points are within the range of about 30% to 50% of the reactor length from the inlet. If the additional catalyst is injected only a short distance downstream from the inlet, the activity of the inlet catalyst will not have declined sufficiently to permit the additional fresh catalyst or freshly regenerated catalyst introduced downstream to provide an overall improvement in cumulative catalyst activity. If the additional catalyst is injected too near the outlet end of the reactor, there is insufficient time for the full effect of its high activity to be realized, and an overall improvement in cumulative catalyst activity is not obtained.

It is also frequently preferred in operations of this type to inject a portion of the feed material to be treated along with the additional streams of catalyst or at spaced points along the reactor downstream from the inlet. Such modifications may be particularly desirable where it is preferred to use some of this feed material as a carrier for the additional streams of catalyst and/or where such feed streams may be used to reduce the temperature of freshly regenerated catalyst and, therefore, provide a better overall heat balance in the reaction zone when the additional catalyst streams are injected therein.

The feed stock employed in the present invention is preferably hydrocarbon distillate, such as a gas-oil hydrocarbon such as one obtained from crude petroleum. However, other fractions may be used such as naphthas and the like. Also, the heavy oil produced in the cracking operation or unconverted portions of the feed stock may form a component of the reaction feed. It is also contemplated that gas-oils produced from thermal cracking operations may suitably be charged to the process of the present invention. It is contemplated that residual crude petroleum fractions may be charged as the feed stocks to the process of the present invention. The present invention may utilize as feed hydrocarbon such stocks as are now used in other thermal or catalytic conversions of hydrocarbons and thus may encompass a wide range of feed stocks. Under some conditions, it may be desired to treat lighter fractions such as those in the heavy naphtha and kerosene boiling range, say, from about 400° to about 750° F. Solvent extracts containing large percentages of aromatic hydrocarbons may also form the feed stock to the present invention. Crude residues remaining after removal of valuable lubricating oil and other fractions may be charged to the process of the present invention.

The invention will be further illustrated by reference to the drawing in which the single figure is a flow diagram of a preferred mode of practicing the invention. Referring now to the drawing, numeral 11 designates a charge line through which a gas-oil fraction is introduced into the system from a source not shown. This gas-oil fraction passes through heat exchanger 12 wherein it picks up heat by heat exchange and is heated to a temperature of about 450° F. The heated gas-oil then is discharged from heat exchanger 12 by way of line 13 and may be split into two streams, one stream flowing by way of line 14 into a furnace 15 containing a coil 16 wherein the temperature of the gas-oil is raised to a temperature of about 840° F. The other stream is flowed by way of line 17 into the lower portion of a vaporizer drum 18. The preheated stream from furnace 15 flows by line 19 also into vaporizer 18 at a point in the lower section of vaporizer 18 but above the point where the stream from line 17 is introduced.

The relative amounts of streams introduced by lines 17 and 19 are in the approximate ratio of about 1:6.

In vaporizer 18, conditions may approximate a temperature of 825° F. and a pressure of about 40 p.s.i.g. Under these conditions, there is removed from the top of vaporizer 18 by way of line 20 a vaporous fraction, and there is removed from the bottom of vaporizer 18 by line 21 a liquid fraction.

The vaporous fraction in line 20 is routed thereby into a conduit 10 where it is admixed with a finely divided cracking catalyst which is introduced from conduit 22, controlled by a valve 23. In conduit 10, the finely divided catalyst is formed in a suspension in the vaporous stream introduced by line 20, and the suspension is then flowed into the lower inlet end of a vertical elongated reaction zone 24. At the entrance to the vertical elongated reaction zone 24, the suspension has added to it the liquid stream from line 21, and downstream from the point of addition of the liquid stream there is added to the suspension a liquid hydrocarbon feed introduced by line 25 from a later stage in the process, which will be described in more detail hereinafter.

Another portion of catalyst is removed from conduit 22 through a conduit 90 controlled by valve 91. This catalyst is preferably passed as a dense suspension through conduit 90 by introducing therein a fluidizing vaporous material through line 92. This material may be steam or other hot inert gas introduced by line 94 controlled by valve 85, or a portion of the vaporized feed may be withdrawn from line 20 via line 92 by controlling valve 93. The suspension is forced upwardly through conduit 90 and is introduced into reactor 24 at a point intermediate the inlet and outlet ends of the reactor. Preferably, it is introduced at a point above but adjacent to a low pressure drop baffle 96 located about one-third or more of the reaction length downstream from the reactor inlet.

If desired and as influenced by the volatility or other characteristics of the feed stock, the feed stock may be by-passed around the vaporizer 18 through line 80 controlled by valve 81. When operating in this manner, the feed may be routed through furnace 15 by line 14 and branch line 83, valve 82 being opened and valve 84 in line 17 and valves 85 and 87 being closed. Alternatively, the feed stock may be routed through line 17 and branch line 86 which connects into line 80 by opening valves 84 and closing valves 82 and 85, valve 87 remaining closed. When passing a liquid feed stock through line 20 the heat for vaporization of the feed stock is provided by the hot catalyst when the two are admixed in line 10.

The suspension then carrying the liquid stream introduced by line 10 and the liquid hydrocarbon feed introduced by line 25 flows upwardly through reaction zone 24. Of course, it is understood that the liquid hydrocarbon streams introduced by lines 21 and 25 under the conditions prevailing in the reaction zones 21 and 24 also become vaporized. As the suspension from line 10 flows up through reactor 24, substantial cracking takes place but after a relatively short catalyst residence time, such as about 5 to 15 seconds, the activity of the catalyst declines and the rate of cracking decreases. Freshly regenerated catalyst is then introduced into the suspension via line 90, and the rate of cracking is increased. The ratio of catalyst introduced via line 10 to that via line 90 is conveniently about 1:1. The additional catalyst may be introduced at several spaced points along the reactor. Operations may be conducted in reaction zone 24 to maintain a temperature of about 930° F., a pressure of 30 p.s.i.g., and the suspension may contain a total of about 10 tons of catalyst. It is also frequently preferred to introduce a portion of the vapor feed directly into reactor 24 at one or more spaced points intermediate the inlet and outlet, particularly at points adjacent the introduction of additional catalyst. This is suitably done by means of line 97 containing valve 98 and leading from line 20 to reactor 24.

After passage through the elongated reaction zone 24, the several hydrocarbon streams introduced therein have been substantially cracked to desirable products which are contained in the suspension. This suspension containing the desirable products flows by way of an outlet conduit 26 into a catalyst vessel 27 which is provided with an upper section 28, which may be termed a spent catalyst section, and a lower section 29, which may be termed a catalyst stripper section.

The suspension containing desirable products is introduced into the vessel 27 through a distributor box 30 which is provided with a riser 31 which allows the catalyst and vaporized products to discharge upwardly into section 28 and also allows the products and suspension to be discharged downwardly into section 29. The upper section 28 is provided with at least a separating means which may be a plurality of cyclones 32, which are well known to the art. These cyclones 32 may be interconnected to allow the gases and desirable products to flow from the lower of the cyclones sequentially through the cyclones to insure maximum separation of the products from the catalyst. The cyclones are provided with dip legs 33 which discharge the catalyst downwardly in the vessel 27 and specifically into the sections 28 and 29. The catalyst separated from the desirable products flows downwardly in stripper 29, which is provided with a plurality of baffle plates 34 which insures contact of the catalyst with stripping steam or a stripping gas which is introduced into the section 29 by line 35 through manifold 36. The steam flowing countercurrently to the descending catalyst removes volatilizable carbonaceous material from the catalyst which flows downwardly in the catalyst stripper section 29 and outwardly therefrom through the cone-shaped section 37 into a conduit 38 controlled by a valve 39. The conduit 38 connects into a transverse conduit 40 which is provided with line 41, through which air is introduced into conduit 40. The air picks up the stripped catalyst and discharges it by way of conduit 40 into a regenerator vessel 41' where a regeneration operation takes place which will be described in more detail hereinafter.

The products from the cracking reaction substantially separated from catalyst are withdrawn from vessel 27 by way of conduit 42, which introduces the desirable products into the lower section of a fractionation zone 43, wherein the desirable products are separated and recovered. The fractionation zone may comprise a plurality of distillation towers which may be shown for convenience as a single distillation tower.

Fractionation zone 43 may operate at a top temperature of about 275° F. and a bottom temperature of about 700° F. A pressure of about 22 p.s.i.g. may be maintained on the fractionation zone 43.

Under these conditions, there may be removed from zone 43 by line 44 a fraction containing gaseous materials and the lighter fractions such as the desirable vaporous hydrocarbons having three or more carbon atoms in the molecule. For example, the stream withdrawn by line 44 may contain propane, propylene, butanes, and butylenes and the higher boiling hydrocarbons. This stream also contains the desirable cracked gasoline which may be suitably recovered. The stream in line 44 is passed through a condenser and cooler 45 and then discharged by line 46 to stabilization and recovery facilities not shown. A heating oil fraction may be withdrawn from fractionation zone 43 by line 47, and light and heavy cycle gas-oil fractions may be withdrawn from zone 43 by lines 48 and 49, respectively. A heavier fraction is withdrawn from zone 43 by line 50 which connects into line 25 and forms a source for the feed hydrocarbon introduced by line 25 into zone 24. During the cracking operation in zone 24 there is laid down on the catalyst volatilizable carbonaceous material and coke. This material, if allowed to remain on the catalyst, would impair the cracking operation; however, it is desirable to have a small amount of coke or carbonaceous material on the catalyst since this allows the heat necessary for the process to be obtained at least in part by burning this material from the catalyst. It is necessary to remove this material from the catalyst to regenerate same and to allow reuse of the catalyst in the cracking operation. To this end, the air introduced into line 40 by line 41 is supplemented by air introduced into reaction zone 41' by line 53 connecting to a compressor or some other source of air. By controlling the oxygen content of the air or other free oxygen containing gas introduced into regeneration zone 41', it is possible to conduct a combustion or burning operation in regeneration zone 41' such that catalyst is substantially freed of unstrippable carbonaceous material and coke and then may be reused in the process. For example, the regenerator 41' may contain about 100 tons of catalyst which is contacted with about 47,000 standard cubic feet of air per minute causing combustion of the combustible material on the catalyst. The other conditions for maintenance for the combustion operation may be a temperature of about 1100° F. and a pressure of 11 p.s.i.g.

The regenerated catalyst in a suspension of the combustion products then flows from regeneration zone 41' by way of line 54 into a regenerated catalyst vessel 55 through a distribution box 56.

The regenerated catalyst vessel 55 is provided with separation means illustrated by cyclones 57 which may be arranged for sequential flow of the suspension therethrough to obtain maximum separation of catalyst from the combustion products, which may be termed flue gas. The cyclones 57 are provided with dip legs 58 which discharge the separated catalyst back into the vessel 55. This vessel may contain catalyst at a temperature of about 1125° F. and is of a suitable size to provide storage for about 50 tons of regenerated catalyst. Air may be introduced into vessel 55 by line 59.

Conduit 22 withdraws the catalyst from the vessel 55 for introduction into conduits 10 and 90, as has been described, while conduit 60 controlled by valve 61 provides recycle of catalyst from vessel 55 into regenerator 41'. Conduit 60 connects into a conduit 62, into which is introduced by line 63 a sufficient amount of air to carry the catalyst from conduit 60 through conduit 62 into vessel 41'. The amount of air introduced by line 63 supplements the air introduced by lines 41 and 53.

The combustion products or flue gas from which catalyst has been separated by cyclones 57 in vessel 55 is withdrawn from vessel 55 by conduit 64, which is provided with a waste heat boiler 65 which may be a bank of tubes surrounding or arranged in the conduit 64. The waste heat boiler 65 recovers some of the heat contained in the flue gas which may be at a temperature of 1000° F. The flue gas then flows into cyclones 66 which serve to remove catalyst fines not removed by cyclones 57 from the combustion products. These catalyst fines may have particle diameters in the range from about 0 to 20 microns. The separated catalyst fines are discharged from cyclones 66 by way of line 67 into a line 68, and the disposition of these fines will be described further hereinafter.

The flue gas substantially free of catalyst fines but containing a small amount thereof is then routed by conduit 69 into electrical precipitators 70, which may be of a conventional type where the residual amount of fines is substantially removed from the flue gas. These fines are discharged by line 71 into line 68. Air may be introduced into line 68 by line 72 in an amount sufficient to transport the fines to regenerator 41'.

A flue gas substantially free of fines is then discharged into the atmosphere by way of a conduit 73 which connects into a stack 74. It is not practical to separate completely all of the fines from the flue gas, and a minimum amount of catalyst fines may be discharged through stack 74. In fact, it may be desirable to discharge a minimum amount of catalyst fines, since discharge of a small amount and replacement thereof with fresh catalyst serves to maintain the activity of the catalyst at a high level.

It is frequently desired to adjust the temperature level of the catalyst passing through conduit 90 before introducing it into the reaction zone to avoid changing temperature conditions substantially in zone 24. Heat exchange means 99 may be used for this purpose, for example to lower the temperature level of the catalyst before injection into zone 24.

By virtue of an operation as described in connection with the drawing, it is possible to achieve substantially improved and unexpected results in cracking hydrocarbons. Thus, with the present invention, by introducing a portion of the catalyst as one or more streams downstream from the usual oil-catalyst inlet, it is possible to conduct a cracking operation at higher conversions than in usual operations where all of the catalyst is introduced with the feed, when using a given feed and catalyst charge rate and for a given reaction vessel. Operations by the procedures of this invention avoid the necessity of lengthening the reactor vessel to obtain a greater conversion for a given set of conditions, and avoids the need of operating with catalyst in the dense phase to obtain higher conversions.

While the reaction zone 24, as shown in the drawing, provides for upward flow of the suspension of catalyst in hydrocarbon, the beneficial results of practicing the present invention may also be obtained when the catalyst and reactants are flowed downwardly in the reactor. To accomplish downward flow, suitable spacial rearrangement of the apparatus elements in the catalyst cycle may be required.

In commercial operations carried out in accordance with the prior art and the present invention, a gas-oil fraction is divided into a vapor feed and a liquid feed and the vapor feed is admixed with regenerated catalyst to form a suspension. The liquid feed is then mixed with the suspension and the admixture has added to it a recycle feed such as one obtained from line 50 in the drawing. This suspension is then flowed into the inlet of a vertical elongated reaction zone having an overall length of about 55 feet and having an internal diameter for about 35 feet of its length of about 8 feet, which tapers for its lower 20 feet of length down to about 6 feet internal diameter. The suspension is flowed through the reaction zone at a superficial gas velocity at about 11 feet per second, a weight ratio of feed per hour per pound of catalyst in the reactor of about 38 and at an average temperature of about 930° F. Under run 1 conditions, all of the catalyst is injected into the inlet of the reaction zone, and the percent conversion of the gas-oil is about 50.5.

In run 2 the operation employs the same conditions used in run 1 with the exception that the weight ratio of the pounds of oil feed per hour to the pounds of catalyst in the reactor is decreased to 13:1 by increasing the length of the reactor to a total of 160 feet, thereby permitting increased catalyst hold up in the reaction zone at substantially the same superficial gas velocities. Under these conditions the feed conversion is increased to 63.4%.

In run 3 the same conditions and reactor are employed as in run 1 with the exception that only 50% of the catalyst is introduced with the feed in the reactor inlet and the remaining 50% of the catalyst is introduced into the reaction zone at a point 20 feet from the inlet (about 37% of the length of the reactor from the inlet). Under these conditions the conversion is 63.4%.

The summarized information for these runs is shown in Table I:

*Table 1*

| Run No. | 1 | 2 | 3 |
|---|---|---|---|
|  | Single Stage (One Injection Point) | Single Stage (One Injection Point) | Two Stage (Spaced Injection Point) |
| Fresh Feed Rate, b./d | 50,000 | 50,000 | 50,000 |
| Recycle Feed, b./d | 5,000 | 5,000 | 5,000 |
| Reactor length, feet | 55 | 160 | 55 |
| Conversion, percent | 50.5 | 63.4 | 63.4 |
| Catalyst Circulation Rate, Tons/Min | 30 | 30 | 30 |
| Catalyst Holdup in Reactor, Tons | 9.5 | 28.0 | 9.5 |
| Catalyst feed to 1st Stage, Tons/Min | 30 | 30 | 15 |
| Catalyst feed to 2nd Stage, Tons/Min |  |  | 15 |
| Wt. Ratio, Lbs. Feed/Hr. to pound of catalyst in Reactor | 38 | 13 | 38 |
| Catalyst to Oil Wt. Ratio: |  |  |  |
| First Stage | 5.0 | 5.0 | 2.5 |
| Second Stage |  |  | 5.0 |

It is thus seen that increasing the catalyst hold up in the reactor (i.e. increasing the weight ratio of the pounds of feed per hour to the pounds of catalyst in the reactor) as is done in run 2 permits increased conversion at the sacrifice of increasing reactor length. By introducing equal amounts of the same total amount of catalyst at the inlet end and at a point intermediate the inlet and outlet, conversion is maintained at a high level without changing any of the other overall operating conditions. Under the conditions used in accordance with the present invention, the carbon deposition on the catalyst is maintained at the same low value achieved in operations where all of the catalyst is introduced with the feed in the inlet.

The catalyst employed in the practice of the present invention may be a silica-alumina catalyst having particle diameters in the range from about 0 to about 100 microns with a major amount of the catalyst having particle diameters in the range from about 20 to about 80 microns.

While it is preferred to use silica-alumina catalyst, the invention may be practiced with silica-magnesia catalyst, silica-zirconia catalyst, cobalt molybdate on alumina, alumina and many other finely divided catalysts known to the art.

The catalyst particles suitably may have a specific gravity in the range of about 1.6 to about 2.73 with a preferred specific gravity in the range from about 1.92 to about 2.40.

What is claimed is:

1. The method of catalytically cracking a vaporized hydrocarbon feed material with a finely divided solid consisting of regenerated cracking catalyst which comprises introducing a suspension of said finely divided solid in said vaporized feed material into the inlet of a unitary elongated treating zone having a length to diameter ratio in the range from about 4:1 to about 20:1, flowing said suspension through the entire length of said zone under treating conditions and at a gas velocity of at least 8 feet per second, introducing an additional amount of said solid into the suspension in said zone at at least one point located within the range of 20% to 70% of the length of the reactor downstream from said inlet, the total amount of said solid introduced into said zone being the same as that which would be introduced into said zone at a single point and sufficient to provide therein a weight ratio of said feed per hour to said solid of at least about 20:1 whereby increased conversion of said vaporized hydrocarbon is obtained over said single point introduction, and withdrawing contacted feed and solid through the outlet of said zone.

2. A method as in claim 1 wherein the weight ratio of the catalyst introduced into said inlet to said catalyst introduced downstream from said inlet is in the range of about 5:1 to 1:5.

3. The method of catalytically cracking a normally liquid vaporized hydrocarbon in the presence of a finely divided catalyst consisting of regenerated cracking catalyst which comprises introducing a suspension of said catalyst in said vaporized hydrocarbon into the inlet of a unitary vertical elongated reaction zone having a length to diameter ratio in the range from about 4:1 to about 20:1, flowing said suspension through the entire length of said zone at a gas velocity in the range between about 8 and about 50 feet per second under reaction conditions including a pressure within the range of about 0 to 50 p.s.i.g. whereby the rate of activity decline of said catalyst decreases with time, introducing an additional amount of said catalyst into the suspension in said zone at at least one point located within the range of about 20% to 70% of the total length of the reactor downstream from said inlet, the ratio of said catalyst introduced through said inlet to said catalyst introduced downstream from said inlet being in the range of about 3:1 to 1:1.5, the total amount of said catalyst introduced into said zone being the same as that which would be introduced into said zone at a single point and sufficient to provide therein a weight ratio of said hydrocarbon per hour to said catalyst in the range of about 20:1 to about 300:1 whereby increased conversion of said vaporized hydrocarbon is obtained over said single point introduction, and withdrawing reaction products and catalyst from the outlet of said zone.

4. A process for cracking hydrocarbons which comprises forming a suspension of finely divided regenerated cracking catalyst having a specific gravity in the range between about 1.6 and about 2.73 in a normally liquid vaporized gas oil hydrocarbon feed at a temperature in the range of about 800° and 1100° F., introducing said suspension into the inlet of a unitary vertical elongated reaction zone having a length to diameter ratio in the range from about 4:1 to about 20:1, flowing said suspension at said temperature and at a gas velocity in the range between about 8 and 50 feet per second through the entire length of said reaction zone, introducing an additional amount of said regenerated catalyst into said flowing suspension in said zone at at least one stream at a point downstream from said inlet and within the range of about 30% to 50% of the length of said reactor from said inlet, the ratio of said catalyst introduced with said suspension in said inlet to that introduced downstream from said inlet being in the range of about 3:1 to 1:1.5, and sufficient total amount of catalyst being introduced in said reaction zone as that which would be introduced into said zone at a single point to provide a weight ratio of hydrocarbon per hour to catalyst in said zone within the range of about 20:1 to about 300:1 whereby increased conversion of said vaporized hydrocarbon is obtained over said single point introduction, and withdrawing cracked hydrocarbon products and catalyst through the outlet end of said zone.

5. A process for cracking hydrocarbons which comprises forming a suspension of finely divided regenerated cracking catalyst having a specific gravity in the range between about 1.6 and about 2.73 in a normally liquid vaporized gas oil hydrocarbon feed stock at a temperature in the range of about 900° and 1100° F., introducing said suspension into the inlet of a unitary vertical elongated reaction zone having a length to diameter ratio in the range of about 4:1 to about 20:1, said reaction zone having a low pressure drop zone located about one-third of the reaction zone length downstream from the reactor inlet, flowing said suspension at said temperature and at a gas velocity in the range of about 10 to 15 feet per second through the entire length of the reaction zone under reaction conditions including a pressure of from about 20 to 35 p.s.i.g., introducing an additional amount of said regenerated catalyst into said flowing suspension in said reaction zone at the downstream side of said low pressure drop zone, the ratio of said catalyst introduced with said suspension in said inlet to that introduced at said low pressure drop zone being in the range of about 1:1, the total amount of catalyst introduced into said reaction zone being the same as that which would be introduced into said zone at a single point and sufficient to provide a weight ratio of hydrocarbon per hour to catalyst in said zone within the range of about 70:1 to about 250:1 whereby increased conversion of said vaporized hydrocarbon is obtained over said single point introduction, and withdrawing cracked hydrocarbon products and catalysts through the outlet end of said zone.

References Cited in the file of this patent

UNITED STATES PATENTS

| | | |
|---|---|---|
| 2,396,109 | Martin | Mar. 5, 1946 |
| 2,416,730 | Arveson | Mar. 4, 1947 |
| 2,427,341 | Alther Gohr | Sept. 16, 1947 |
| 2,471,104 | Gohr | May 24, 1949 |
| 2,518,474 | Hudson | Aug. 15, 1950 |
| 2,731,508 | Jahnig | Jan. 17, 1956 |
| 2,766,184 | Blanding | Oct. 9, 1956 |